United States Patent
Winrow et al.

(10) Patent No.: US 10,922,082 B2
(45) Date of Patent: Feb. 16, 2021

(54) BRANCH PREDICTOR

(71) Applicant: Arm Limited, Cambridge (GB)

(72) Inventors: Matthew Lee Winrow, Cambridge (GB); Peng Wang, Cambridge (GB)

(73) Assignee: Arm Limited, Cambridge (GB)

( * ) Notice: Subject to any disclaimer, the term of this patent is extended or adjusted under 35 U.S.C. 154(b) by 52 days.

(21) Appl. No.: 16/292,534

(22) Filed: Mar. 5, 2019

(65) Prior Publication Data
US 2020/0285477 A1 Sep. 10, 2020

(51) Int. Cl.
*G06F 9/38* (2018.01)
(52) U.S. Cl.
CPC .......... *G06F 9/3806* (2013.01); *G06F 9/3814* (2013.01)
(58) Field of Classification Search
CPC .............................. G06F 9/3806; G06F 9/3814
See application file for complete search history.

(56) References Cited

U.S. PATENT DOCUMENTS

| 2006/0242391 A1* | 10/2006 | Elwood | G06F 9/3806 |
| | | | 712/238 |
| 2016/0110202 A1* | 4/2016 | Filippo | G06F 9/3844 |
| | | | 712/240 |
| 2019/0384612 A1* | 12/2019 | Evers | G06F 9/3844 |

* cited by examiner

*Primary Examiner* — Zachary K Huson
(74) *Attorney, Agent, or Firm* — Nixon & Vanderhye P.C.

(57) ABSTRACT

An apparatus comprises processing circuitry to perform data processing in response to instructions fetched from an instruction cache, an instruction prefetcher to speculatively prefetch instructions into the instruction cache, and a branch predictor having at least one branch prediction structure to store branch prediction data for predicting at least one branch property of an instruction fetched for processing by the processing circuitry. On prefetching of a given instruction into the instruction cache by the instruction prefetcher, the branch predictor is configured to perform a prefetch-triggered update of the branch prediction data based on information derived from the given instruction prefetched by the instruction prefetcher. This can help to improve performance, especially for workloads with a high branch density and large branch re-reference interval.

17 Claims, 4 Drawing Sheets

BRANCH PREDICTOR

BACKGROUND

Technical Field

The present technique relates to the field of data processing. More particularly, it relates to branch prediction.

Technical Background

A data processing apparatus may have a branch predictor for predicting outcomes of branch instructions before they are actually executed. By predicting branch outcomes before the branch instruction is actually executed, subsequent instructions following the branch can start to be fetched and speculatively executed before execution of the branch instruction is complete. When the prediction is correct then performance is saved because the subsequent instructions can be executed sooner than if they were only fetched, decoded and executed once the outcome of the branch is actually known.

SUMMARY

At least some examples provide an apparatus comprising: processing circuitry to perform data processing in response to instructions fetched from an instruction cache; an instruction prefetcher to speculatively prefetch instructions into the instruction cache; and a branch predictor having at least one branch prediction structure to store branch prediction data for predicting at least one branch property of an instruction fetched for processing by the processing circuitry; in which: on prefetching of a given instruction into the instruction cache by the instruction prefetcher, the branch predictor is configured to perform a prefetch-triggered update of the branch prediction data based on information derived from the given instruction prefetched by the instruction prefetcher.

At least some examples provide an apparatus comprising: means for performing data processing in response to instructions fetched from an instruction cache; means for speculatively prefetching instructions into the instruction cache; and means for branch prediction having at least one branch prediction structure to store branch prediction data for predicting at least one branch property of an instruction fetched for processing by the processing circuitry; in which: on prefetching of a given instruction into the instruction cache by the means for speculatively prefetching, the means for branch prediction is configured to perform a prefetch-triggered update of the branch prediction data based on information derived from the given instruction prefetched by the instruction prefetcher.

At least some examples provide a data processing method comprising: performing data processing in response to instructions fetched from an instruction cache; speculatively prefetching instructions into the instruction cache; and on prefetching of a given instruction into the instruction cache by the instruction prefetcher, performing a prefetch-triggered update of branch prediction data stored in at least one branch prediction structure of a branch predictor, based on information derived from the given instruction prefetched by the instruction prefetcher.

Further aspects, features and advantages of the present technique will be apparent from the following description of examples, which is to be read in conjunction with the accompanying drawings.

DESCRIPTION OF EXAMPLES

Figure 1:
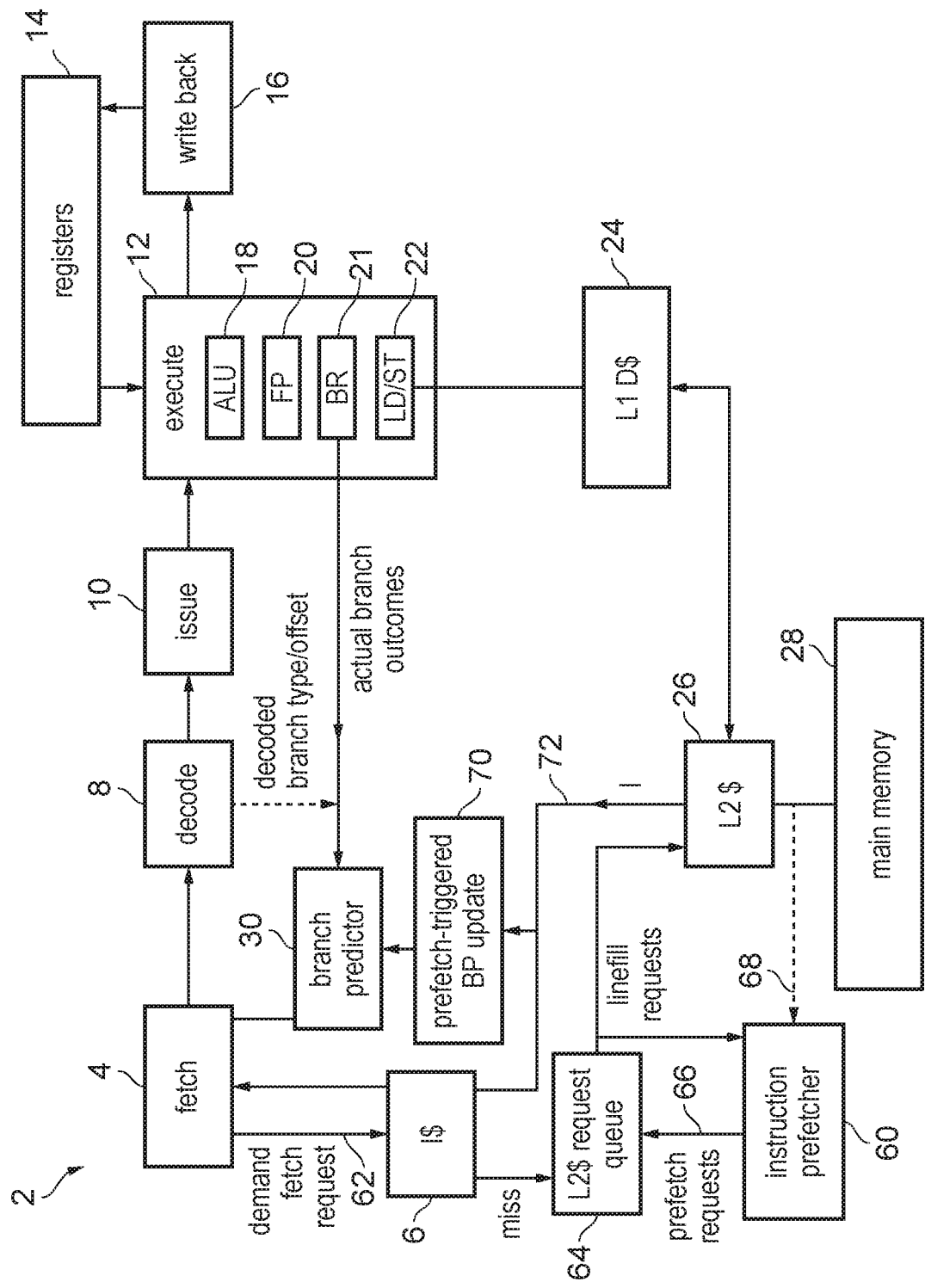
FIG. 1 schematically illustrates an example of a data processing system having a branch predictor.

A data processing apparatus may have processing circuitry to perform data processing in response to instructions fetched from an instruction cache. A branch predictor may be provided which has at least one branch prediction structure for storing branch prediction data for predicting at least one branch property of an instruction fetched for processing by the processing circuitry. The predicted branch property can then be used to control which instructions are fetched next for processing on the processing circuitry. The apparatus also has an instruction prefetcher to speculatively prefetch instructions into the instruction cache. Rather than waiting for a given instruction to be demanded for processing by the processing circuitry, the instruction prefetcher can look ahead or make a prediction of which instructions may be needed in future, to prefetch instructions into the instruction cache before they have actually been demanded by the processing pipeline. This can help improve performance by increasing the likelihood that demand fetch requests hit in the instruction cache.

In the techniques discussed below, on prefetching of a given instruction into the instruction cache by the instruction prefetcher, the branch predictor is able to perform a prefetch-triggered update of the branch prediction data of at least one branch prediction structure based on information derived from the given instruction prefetched by the instruction prefetcher. Such prefetch-triggered updates of branch prediction data may supplement execution-triggered updates of branch prediction data which are performed once the actual result of a branch instruction is known following execution of the branch instruction. By providing a prefetch-triggered update, so that the branch prediction data can be updated based on some information derived from a prefetched instruction at the time of prefetching, rather than needing to wait for that instruction to be fetched for processing before updating the branch prediction data based on the instruction, this can increase the likelihood that when the instruction is fetched for processing, there is relevant branch prediction data in the branch prediction structures to enable a branch prediction to be made for that instruction. This can increase the likelihood that the address of the next instruction can correctly be predicted, improving performance.

While performing a prefetch-triggered update can provide a performance benefit for any processing workload, it can be particularly useful for improving performance of certain processing workloads for which existing branch predictors may provide poor performance. A branch prediction structure may have a finite capacity for storing branch prediction data and so the number of different branches for which branch prediction data can be stored in the branch prediction structure may be limited. For a software workload which has a high branch density and which has a high re-reference interval (number of other branches executed between two successive instances of executing the same branch), a problem may arise in existing branch predictors where the first time the branch is encountered, a new entry is allocated in the branch prediction structure for storing information about that branch, but by the time the same branch is seen again, that previously allocated entry may already have been evicted because there have been too many other branches seen between the two references to the same branch. By performing a prefetch-triggered update of the branch prediction data based on information derived from a prefetched instruction, then if the re-referenced branch is prefetched by the instruction prefetcher some time before it is actually fetched for processing, then the branch predictor may be re-populated with information on that branch so that when the branch is subsequently fetched for processing the branch prediction structure may already have a matching entry for that branch even if it has been some time since the branch was previously fetched for processing.

In any case, even for software which does not have a high re-reference interval, the prefetch-triggered update can still provide a performance benefit, because in the absence of performing any prefetch-triggered update, each branch would have a compulsory miss in the branch prediction structure the first time it is encountered. By performing the prefetch-triggered update, some of these misses can be avoided, allowing better performance for the first time the branch is encountered.

The prefetch-triggered update of branch prediction data could be used to update a range of types of information about a branch instruction. However, it can be particularly useful to use the prefetch-triggered update to allocate a new entry of branch-prediction state which specifies at least one of a branch type and a branch target address derived from the given instruction prefetched by the instruction prefetcher. The branch type and the branch target address may be examples of information which can be identified directly from the instruction encoding of the prefetched branch instruction, making it more suitable for being updated based on a prefetched instruction.

The prefetch-triggered update may be based on information obtained by decoding an instruction encoding of a given instruction. In some implementations, additional decoding logic may be provided, separate from the instruction decoder which decodes instructions when they are actually fetched for processing, to derive information from a prefetched instruction to determine whether to perform the prefetch-triggered update. This prefetch-triggered decoding logic may perform a more limited decoding operation than the full decoding performed by the instruction decoder on fetching. For example the prefetch-triggered decoding may be limited to identifying whether the instruction is a branch and if so, to identifying certain parameters of the branch such as the branch type and the branch target address. Hence, it would not be necessary for the prefetch-triggered decoding logic to include circuit logic for distinguishing between different types of instructions in cases when the instruction is identified as not being a branch, for example.

The prefetch-triggered update need not always be performed for every branch instruction that is prefetched. In one example, the branch predictor may omit performing the prefetch-triggered update when the at least one branch prediction structure already includes an entry corresponding to the given instruction. When the given instruction already has an entry allocated in the at least one branch prediction structure then it is more likely that this already allocated entry may provide a correct prediction than a new entry allocated based on the information derived from the prefetched instruction, as the already allocated entry could have been updated based on actual branch outcomes of executed branches which may better reflect the behaviour of the same branch in future. Hence, omitting the prefetch-triggered update when the given instruction already has an entry allocated in the at least one branch prediction structure can improve performance by preserving the previously allocated prediction state. The branch predictor may therefore restrict the prefetch-triggered update to being performed when a given instruction is prefetched which does not already have an entry allocated in the at least one branch prediction structure.

The prefetch-triggered update need not be performed for all branch instruction types. In some implementations, on prefetching the given instruction, the branch predictor may perform the prefetch-triggered update when the given instruction is identified to be one of a subset of branch instruction types. At least one branch instruction type could be excluded from this subset. For example, some types of branch may be more difficult for training the branch predictor at the time of prefetching. By excluding certain types of branch from the prefetch-triggered branch prediction updates, this can improve performance by reducing the probability of potentially unreliable information being allocated to the branch prediction structure which could potentially evict more useful branch information which has been trained on actual outcomes of branch instructions.

In some examples, the excluded branch instruction type (which is not part of the subset of branch instruction types for which a prefetch-triggered update is performed) may comprise an indirect branch instruction other than a return branch instruction. An indirect branch instruction is an instruction for which the branch target address is not specified directly in the instruction encoding, but depends on values stored in a register referenced by the instruction. Hence, at the time of execution of an indirect branch instruction, the branch target address may depend on the outcomes of instructions executed previously. The values that those registers will have at the time the prefetched instruction is later executed may not be predictable at the time of prefetching, so it can be useful to exclude indirect branch instructions other than a return branch instruction from the prefetch-triggered branch prediction update.

Another type of branch instruction which could be prefetched is a direct branch instruction, for which the branch target address (the address of the instruction to be fetched next after the branch if the branch is taken) is specified directly in the instruction encoding of the instruction, rather than depending on a value in a register. For a direct branch instruction, the branch target address could be specified either as an absolute address, which is completely specified in the instruction, or as a relative offset, which identifies the branch target address relative to the instruction address of the branch itself. When the prefetched instruction is a direct branch instruction, then the branch predictor is able to identify the target address of the branch directly from the branch instruction encoding. Hence, when the given instruction is a direct branch instruction, the prefetch-triggered update may comprise allocating a new entry of branch prediction state which specifies an association between an instruction address of the direct branch instruction and a branch target address specified by the direct branch instruction. By allocating such an entry at the time of prefetch, performance can be improved since the addresses of instructions to be fetched after the direct branch can be identified sooner based on the prefetch-allocated branch prediction entry than if the pipeline had to wait until the instruction passed through the fetch and decode stages before being able to identify the branch target address and then allocating the branch prediction entry specifying the branch target address. That is, due to the prefetch-triggered update of branch prediction state, the benefit of the branch prediction entry can be seen on the "first time" the instruction is fetched from the instruction cache, rather than having to wait for the second or further times the instruction is fetched from the instruction cache.

Another type of branch instruction may be a return branch instruction. A return branch instruction may be a type of branch instruction used to return to previous processing after processing of a function call. For the return branch instruction, rather than identifying the branch target address itself, the branch target address may be determined based on an address stored in a certain register, for example known as a link register. When calling a function, a branch-with-link instruction may be executed, which in addition to branching to a target address representing the start of function code to be executed, may also cause the address of the next sequential instruction after the branch-with-link instruction to be stored to the link register. When reaching a return branch instruction at the end of the function call, processing may then branch back to the instruction whose address is indicated in the link register. This approach enables the same function call to be called from a number of different points of the program code, with processing returning from the function back to the appropriate location from which the function was called. For predicting the target address of return branch instructions, a branch predictor may have a separate prediction structure known as a call-return stack. When a branch-with-link instruction is encountered, the address of the next sequential instruction may be pushed onto the call-return stack. When an instruction is predicted to be a return branch instruction, its target address may be predicted based on an address popped from the top of the call-return stack. This can enable the target address of a return branch instruction to be predicted sooner, to improve performance.

Hence, when the given instruction that is prefetched is a return branch instruction, the prefetch-triggered update may comprise allocating a new entry of branch prediction states specifying an association between an instruction address of the return branch instruction and a branch type indication specifying that the instruction at that instruction address is a return branch instruction. By allocating such an entry at the time of prefetch, then when the return branch instruction is subsequently fetched for processing, the branch predictor may already include branch prediction state identifying that the instruction is predicted to be a return branch instruction, and therefore can determine that the target address of the return branch instruction should be predicted based on the call-return stack, rather than using an alternative branch prediction structure for predicting target addresses.

Another type of branch instruction may be a conditional branch instruction. A conditional branch instruction could be either a conditional direct branch instruction or a conditional indirect branch instruction. Conditional indirect branch instructions may have the prefetch-triggered update omitted as discussed above.

In some examples, on encountering a conditional direct branch instruction that is prefetched into the instruction cache, it would be possible for the prefetch-triggered update of branch prediction state to take place regardless of whether that conditional direct branch instruction would be predicted to be taken or not-taken. Hence, for such implementations, when the prefetch instruction is a conditional direct branch instruction, the prefetch-triggered update may be performed without triggering any prediction of whether the conditional branch instruction is to be taken or not-taken.

However, in other examples, when the given instruction is a conditional direct branch instruction, the branch predictor may obtain a prefetch-triggered prediction of whether the conditional direct branch instruction is predicted to be taken or not-taken. When the prefetch-triggered prediction predicts that the conditional direct branch instruction is to be taken, then the prefetch-triggered update may be performed, and when the prefetch-triggered prediction predicts that the conditional direct branch instruction is to be not-taken then the prefetch-triggered update of branch prediction state may be omitted.

Hence, with this approach, whether the prefetch-triggered update is performed or not is conditional on whether the conditional direct branch instruction is predicted to be taken or not-taken, based on a prediction made at the time of prefetching (rather than a prediction made on a demand fetch). This approach can improve performance because it avoids populating the branch prediction structure with entries which indicate properties of branches expected to be not-taken. As a typical branch predictor may, in cases where the branch prediction structure does not have any valid entry for the fetched instruction, treat the fetched instruction as if it is not a branch, and so may determine that the next instruction to be fetched should be the instruction following on sequentially in instruction address order, then effectively the default prediction of the branch prediction is to predict all instructions as not-taken unless the branch prediction structure stores a branch prediction state entry which specifies otherwise. Hence, it may not be useful to allocate information about branches expected to be not-taken to the branch predictor at the time of prefetching, because this could overwrite information on other branches expected to be taken, which may be more useful information to retain. Hence, by providing a pre-prediction at the time of prefetching, for predicting whether a conditional direct branch is to be taken or not-taken, and conditionally performing the prefetch-triggered update to the branch prediction state when the conditional direct branch instruction is predicted to be taken, then this increases the likelihood that useful branch prediction state is retained in the branch prediction structure, improving performance.

The prefetch-triggered prediction (used as a basis for deciding whether to update the branch prediction state in response to the conditional direct branch instruction at the time of prefetch) may be a more limited prediction than taken/not-taken predictions that may be performed when an instruction is actually fetched for processing. This may be because when performing branch predictions for demand fetched instructions, the branch predictor may have access to more information on the previous history of execution preceding the fetched instruction than would be available at the time of prefetch.

Hence, in one example the prefetch-triggered prediction could comprise a static branch prediction, which is based on properties of the branch instruction itself and/or pre-determined state or pre-determined rules, without using any dynamic runtime history or context information about the context in which a branch is executed, such as context information derived from previous instructions executed before the branch. For example, a rule for static branch prediction could be that forward branches, which have a positive address offset for determining the branch target address relative to the address of the branch instruction itself, are predicted as not-taken, while backwards branches which have a negative branch offset are predicted as taken.

This rule may exploit the fact that backwards branches are often used in loops, where the branch may be taken for a certain number of times until the loop is complete and then not-taken once, so that it is more likely that backwards branches are taken than not-taken. Other forms of static branch prediction could consider other information about the branch, such as information derived from the branch opcode of the branch instruction.

In another example, the prefetch-triggered prediction may be a dynamic branch prediction which is based on branch prediction state which is dynamically updated based on outcomes of executed branch instructions. In this case, the branch prediction state used to perform the prefetch-triggered prediction can be information trained based on actual branch execution, derived from previous instances of executing the branch. However, in this case, the dynamic branch prediction used for the prefetch-triggered prediction may be based on branch prediction state stored in a branch prediction structure which is indexed based on an index value which is determined independent of the global history value, which is a value tracking taken or not-taken outcomes or branch instruction addresses for a sequence of two or more branch instructions.

Some forms of branch prediction structure may be indexed based on a value which depends not only on the properties and runtime behaviour of the current branch being predicted, but also on a global history value which tracks information about a sequence of earlier branches leading up to that current branch. For example a global branch history value may be updated each time a branch is seen based on the taken or not-taken outcome of branch, with each successive branch (including branches of different instruction addresses) having their outcome shifted in or used to permute the same global branch history value. This means the global branch history value tracks the outcomes of multiple branches. Another form of a global address history value may be a value which is updated with each instruction address of each encountered branch. Such global history values may be useful for helping to distinguish different routes by which the same branch could be reached in the program code.

Such a global history value may not be used for the prefetch-triggered prediction because at the time of prefetching, the global history value would be tracking information about the most recently seen branch instructions at the current point of program execution, rather than the sequence of branch instructions which will in future be executed just before the currently prefetched instruction when that prefetched instruction is later executed. Therefore, the global history value may not be considered when performing the prefetch-triggered prediction. Even in branch predictors which include structures indexed based on a global history value, the branch predictor could also include a further branch prediction structure which is indexed independently of the global history value. For example, some branch predictors may include a fallback prediction structure which is indexed only based on the instruction address, to use as a fallback in case the more complex predictors which consider the global history value do not record a hit for a particular branch. Hence, when a dynamic branch prediction is used for the prefetch-triggered prediction of whether a conditional direct branch instruction prefetched by the prefetcher is to be taken or not-taken, this prefetch-triggered prediction may use branch prediction state stored in a structure which is indexed independent of the global history value. This improves the reliability of the prefetch-triggered update based on the pre-prediction.

The prefetch-triggered update of branch prediction state could be made in a range of different types of branch prediction structure. However, it can be particularly useful for at least one branch target buffer provided for recording branch properties including at least a branch target address. In some cases the branch target buffer may also record information on branch instruction types of predicted branch instructions. Other prediction structures as such as a conditional branch direction predictor for predicting whether a conditional branch instruction should be taken or not-taken may be excluded from being updated by a prefetch-triggered update. Also, a call-return stack provided for tracking predicted return addresses for return branch instructions could also be excluded from being updated by a prefetch-triggered update, as the call-return stack may use a last-in-first-out (LIFO) structure and so the ordering of allocation of return addresses onto the call-return stack may need to track the nesting of actual branches fetched for execution, which would be disrupted by additional allocations made for prefetched instructions. Hence, for return branches, the prefetch-triggered update may be made in the branch target buffer rather than in the call-return stack, to record in the branch target buffer that the instruction at the prefetched instruction address is a return branch instruction.

Some systems may comprise multiple branch target buffers. Each branch target buffer may record at least one predicted branch property for a predicted branch instruction, including at least a branch target address. The provision of multiple branch target buffer structures can help to balance performance against capacity. For example the branch predictor may include a first branch target buffer and a second branch target buffer which satisfy at least one of: the first branch target buffer comprises fewer branch prediction entries than the second branch target buffer; and branch predictions made for a given instruction based on the second branch target buffer are made available when the given instruction is at a later pipeline stage than branch predictions made for the given instruction based on the first branch target buffer. This approach can be beneficial for performance since if there is a hit in the first branch target buffer this may allow the branch prediction to be made available earlier and the lookup to be performed with less power cost than if the second branch target buffer is required, which can help to improve performance. However if there is a miss in the first branch target buffer, then the larger second branch target buffer may be able to provide a branch prediction, which enables improved performance compared to if the first branch target buffer was the only branch target buffer.

In some systems the prefetch-triggered update of branch prediction state could be performed in both the first and second branch target buffers, or could be performed in the second branch target buffer only.

However, it can be particularly useful for the prefetch-triggered update of branch prediction data to comprise an update in the first branch target buffer. In some systems, the branch predictor may be incapable of updating branch prediction data in the second branch target buffer based on a prefetch-triggered update. In this case the branch prediction data in the second branch target buffer may be restricted to being updated based on actual branch outcomes of executed branch instructions, rather than being updated based on information derived from prefetching. The prefetch-triggered update in the first branch target buffer may provide a greater performance boost because as the first branch target buffer may comprise fewer branch prediction entries than the second branch target buffer, the first branch target buffer may be more prone to the problem discussed above where workloads with a large re-reference interval and high branch density overload the smaller branch prediction structures so that entries are evicted before a previously seen branch is encountered again. Also, the performance benefit of performing the prefetch-triggered update in the first branch target buffer may be greater than for the second branch target buffer because the branch predictions are available earlier based on the first branch target buffer than for the second branch target buffer so the reduction in branch penalty enabled by the prefetch-triggered update is greater for the first branch target buffer than the second branch target buffer. Of course, it would also be possible to perform the prefetch-triggered update of branch prediction data in the second branch target buffer. However, as there is more of a performance benefit in the first target buffer, some implementations may prefer to save circuit area and power by not providing any logic for triggering the prefetch-triggered update in the second branch target buffer, and instead updating state in the second branch target buffer exclusively based on information derived from demand fetched instructions after those instructions have been fetched from the instruction cache.

While the examples discussed above mention a first branch target buffer and the second branch target buffer, other implementations may have three or more branch target buffers. Hence the first and second branch target buffers may be any two of the branch target buffers providing the system, and so the mention of first and second branch target buffers does not exclude the possibility of their being a further branch target buffer.

FIG. 1 schematically illustrates an example of a data processing system 2. The system includes a processing pipeline which includes a number of pipeline stages including a fetch stage 4 for fetching program instructions from an instruction cache 6 or from a memory system, a decode stage 8 for decoding the fetched instructions, an issue stage 10 for checking whether operands required by the instructions are available and issuing the instructions for execution once the operands are available, an execute stage 12 for executing the instructions to perform data processing on operands read from registers 14 and generating processing results, and a write back stage 16 for writing the processing results generated by the execute stage 12 back to the registers 14. The execute stage includes a number of execute units, including in this example an arithmetic/logic unit (ALU) 18 to perform arithmetic or logical operations, a floating point unit 20 for performing operations involving floating point numbers, a branch unit 21 for determining the outcome (taken/not-taken direction and target address) of branch instructions, and a load/store unit 22 for handling memory access operations, such as load instructions for loading data from a memory system into the registers 14 or store instructions for storing data from the registers 14 to the memory system. In this example the memory system includes the instruction cache 6, a level 1 data cache 24, a shared level 2 cache 26 used for data and instructions, and main memory 28. It will be appreciated that this is just one example of a possible memory hierarchy and other arrangements of caches or memories could be provided. Also, the particular arrangement of pipeline stages shown in FIG. 1 is just one example and other pipeline stages could be provided, such as a register renaming stage in an out of order processor. While FIG. 1 shows each stage 4, 8, 10, 12, 16 as a single stage, it will be appreciated that any one or more of these stages could be further sub-divided into multiple pipeline stages, which take several cycles for instructions to pass through.

Figure 2:
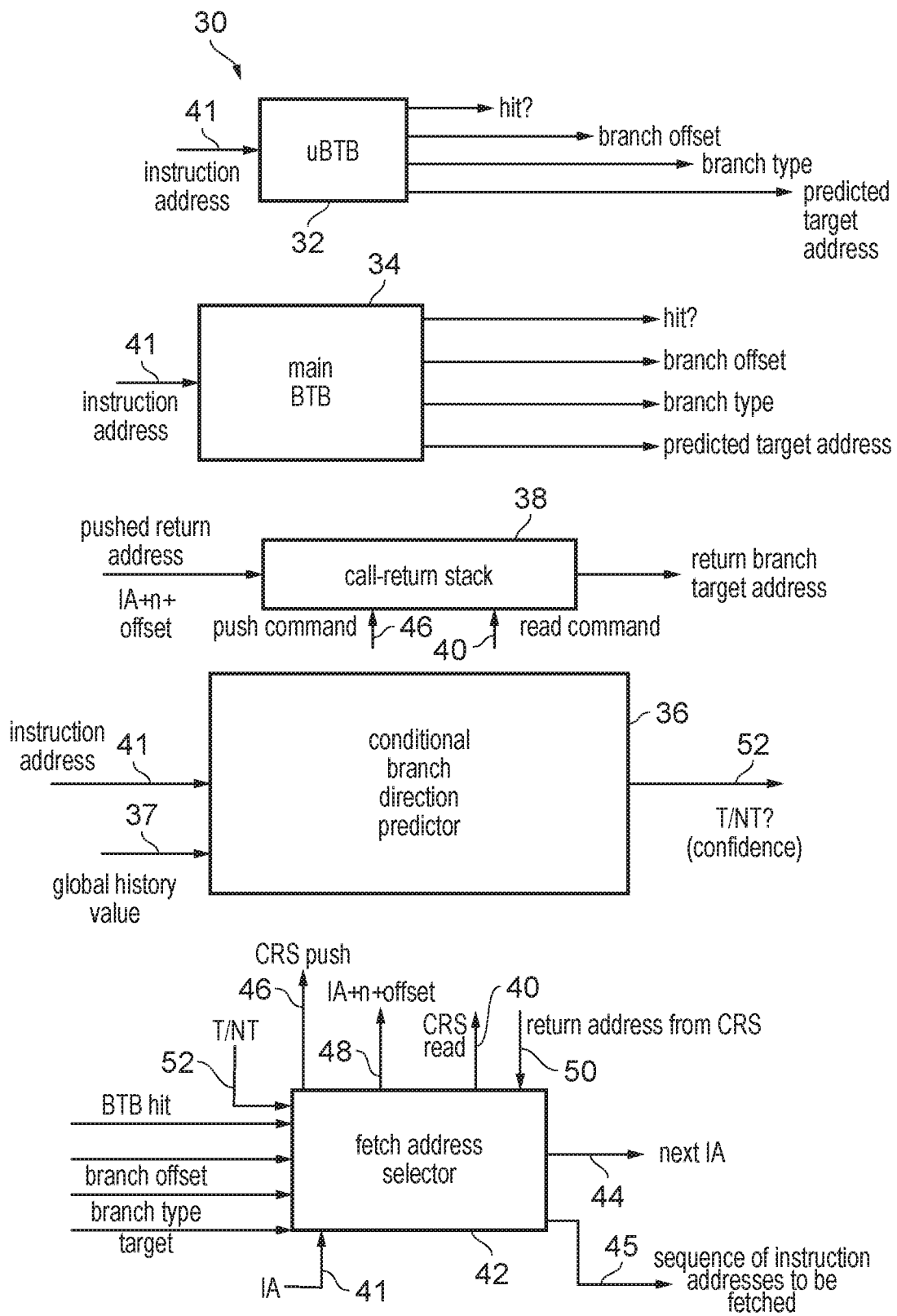
FIG. 2 shows an example of components of the branch predictor.

The apparatus 2 has a branch predictor 30 for predicting outcomes of branch instructions to be executed by the pipeline. FIG. 2 illustrates an example of branch prediction structures of the branch predictor 30. In this example the branch prediction structures include two branch target buffers (BTBs), including a micro-BTB (uBTB) 32 and a main BTB 34. Both the uBTB 32 (first BTB) and the main BTB 34 (second BTB) are structures for predicting a number of properties of branch instructions including their branch type and their target address. The uBTB 32 is a smaller structure than the main BTB 34, having capacity for storing information on fewer branches. As the main BTB 34 has a larger capacity, it may take longer to look up whether it contains an entry corresponding to a given fetched instruction address, and if so, to return the corresponding prediction of branch type and branch target address. Hence the prediction made for a given instruction based on the uBTB 32 may be available when that instruction is at an earlier stage in the pipeline than the corresponding prediction based on the main BTB 34. In cases when the instruction address (IA) of a fetched instruction hits in the uBTB 32, then this may provide a larger performance boost than when it hits in the main BTB 34, because the earlier availability of the prediction means that the next instructions to be fetched can be identified sooner to reduce the branch penalty on a correct prediction. However the provision of a larger BTB structure in the main BTB 34, in addition to the uBTB 32, allows for greater capacity to increase the overall number of branches for which predictions are available. While FIG. 2 shows the provision of two BTB structures 32, 34, other examples could have three or more BTBs of successively increasing size but successively slower branch prediction times.

For both the uBTB 32 and the main BTB 34, the stored branch prediction information comprises a number of entries which each associate a given instruction address with information specifying one of more properties including branch offsets, branch type and predicted target address. While it would be possible to look up the uBTB 32 or main BTB 34 individually for every fetched instruction, in practice this may be inefficient and so the uBTB 32 and main BTB 34 may store entries each associated with a certain block of consecutive instruction addresses. Blocks of instructions which do not contain any branches would not have a BTB entry allocated for them. If there is at least one branch encountered within a block of instructions, then a BTB entry may be allocated and the branch offset specified in the BTB for the corresponding instruction address may identify the relative offset of the instruction address of the branch relative to the instruction address marking the start of the instruction block. Also, the BTB entry may record an indicator of the branch type (e.g. distinguishing whether the instruction is a conditional or unconditional branch or distinguishing whether the branch is one of a number of other special types, including a return branch mentioned below). Also the BTB entry may specify a predicted target address for the branch. Some BTB designs may support predictions for multiple branches per instruction block, in which case there may be two or more separate offset, branch type and target address fields per BTB entry. BTB entries could be updated based on an indication of the decoded branch type and offset based on signals provided by the decode stage 8, or based on actual outcomes of the branch determined by the branch unit 21 in the execute stage 12.

Another branch prediction structure included in the branch predictor 30 may be a conditional branch direction predictor 36, which is used to predict whether conditional branch instructions should be taken or not taken. When a predicted branch is taken, this means that the next instruction to be fetched after the branch should be the instruction at the target address or predicted target address of the branch. When the branch is predicted not taken then the next instruction to be fetched after the branch should be the instruction whose instruction address follows on sequentially from the instruction address of the branch itself. The conditional branch direction predictor 36 may make its prediction based on stored branch prediction state which is indexed based on an index value determined from one or more inputs, which could include the current instruction address (IA) for which the prediction is made, as well as other information such as a global history value 37 which may track behaviour of earlier instructions leading up to the current instruction.

For example the global history value 37 may be derived from a global history register comprising a series of bits which indicate whether the immediately preceding N branches were each predicted taken or not taken. Each time a branch has its outcome predicted by the branch predictor, the corresponding taken/not-taken prediction could be shifted into the global branch history register, causing the taken/not-taken outcomes for previous branches to be shifted up one place, so that the global branch history register may over time always be tracking the outcomes of the most recently seen N branches. These most recently seen N branches may include branches from a number of different branch instruction addresses, that is the global branch history register does not merely record successive outcomes of the same branch, but provides a global indication of the behaviour of the program code as a whole.

Another form of global history value 37 may be an address history value which tracks information derived form a sequence of instruction addresses associated with the most recently seen M branches, where M is an integer. In some cases the global address history value could simply be a concatenation of portions of the instruction addresses of the most recent M branches. Another approach may be that a single address value is permuted each time a branch is encountered based on the instruction address of the latest branch, so that the global address history value may not indicate an actual branch instruction address itself, but may indicate a value which has been derived from the instruction addresses of the most recently seen M branches, so that it depends on the previous history of the code being executed. By maintaining such global history values 37 this can allow different scenarios in which the same branch instruction is encountered to be distinguished from one another so that different predictions for taken/not taken could be made depending on the pattern of behaviour leading up to a given instance of encountering the branch.

The particular technique used by the conditional branch prediction predictor 36 to form the taken/not-taken prediction 52 based on the index may vary, and any technique known in the art for performing conditional branch direction prediction. For example the conditional branch direction predictor 36 could use a perceptron-based prediction technique, in which weights stored in a number of tables, indexed based on the IA or the global history 37 or other branch properties, are added together to form a prediction confidence which can then be thresholded to determine whether the conditional branch is predicted taken or not taken. Another example of a conditional branch direction predictor 36 may be a TAGE-based predictor which includes a number of tables of branch prediction state which are indexed based on successively increasing portions of the global history 37 (with each successive portion of global history corresponding to a longer sequence of history), with the taken/not-taken prediction 52 being selected from the one of the TAGE tables which, among all the TAGE tables which detected a hit for the IA/history, is the one that used as its index the longest portion of global history. Some conditional branch direction predictors 36 could also leave a hybrid scheme where two or more different techniques are used, and depending on the confidence returned by each type of predictor, the prediction having the greatest confidence is selected.

Another form of branch prediction structure which may be included in the branch predictor 30 may be a call-return stack (CRS) 38, which is used to predict the target addresses of return branch instructions. The registers 14 of the processing pipeline may include a register used as a "link register" (other names could also be used for this register). The instruction decoder 8 may support one or more types of branch-with-link instruction, which unlike other types of branch instructions, in addition to branching to the target address also cause the address of the next instruction following on sequentially from the branch to be written to the link register within the register bank 14. This address represents the return address, which effectively marks the point of the program from which a function is called. The subsequent instructions executed after the branch may correspond to the function call to be called, and may end with a return branch instruction, which is another type of branch instruction supported by the instruction decoder 8 and execute stage 12. For a return branch instruction, the execute stage 12 causes program flow to be directed to the instruction whose address is stored in the link register. This approach enables the same function to be called for multiple different locations of the program.

As a return branch instruction does not have a fixed target address, it can be difficult to predict its outcome using the BTB structure 32, 34, so a separate call-return stack may be provided, dedicated to predicting target addresses for return branch instructions. The call-return stack 38 is a last in first out (LIFO) data structure. When one of the fetch stage 4 and the decode stage 8 identifies, either based on a prediction of branch type from the uBTB 32 or main BTB 34, or based on decoding of the instruction opcode, that an instruction is a branch-with-link instruction, the address of the next instruction following the branch may be pushed as a return address onto the call-return stack 38. When the BTB structures 32, 34 identify that a branch is predicted to be a return branch instruction, then a command 40 is sent to the call return stack to request that the address at the top of the stack is obtained and returned as the predicted branch target address for the returned branch instruction. This enables the target address of the return branch to be predicted even if the corresponding branch with link instruction, which would have written the link register, has not yet been executed, enabling the fetch stage 4 to start fetching instructions following the return branch some time ahead of the actual outcome of the return branch being known.

The branch predictor 30 may include a fetch address selector 42 which selects, based on predictions of the various branch prediction structures 32, 34, 36, 38, the next instruction address (IA) 44, which represents the address to be supplied as the input IA 41 in the next cycle of branch prediction. Also, the fetch address selector 42 selects a sequence of instruction addresses 45 which identify which instructions should actually be fetched for decoding from among the block of instructions identified by the input IA 41 used for the current cycle of branch prediction. This sequence of instruction addresses 45 may be allocated to a fetch queue which may control which instructions are fetched from the instruction cache 6.

For example, in cases where the current instruction address misses in both BTBs 32, 34, then the fetch address selector 42 assumes there is no branch in the corresponding block of instructions and sets the next fetch IA 44 to be the instruction of the next block of instructions which follows the current block sequentially. In this case the sequence of fetch addresses 45 allocated to the fetch queue includes all instructions of the current block identified by the input IA 41.

If either of the BTB structures 32, 34 detects a hit, then the fetch address selector 42 determines how to proceed based on the branch type predicted by the one of the uBTB and main BTB 32, 34 which detected the hit. If the current block of instructions is predicted to include a branch-with-link instruction then the fetch address selector sends a call return stack push command 46 to the call return stack together with an indication of the next instruction address 48 (IA+n+offset) after the predicted branch-with-link instruction, which will correspond to the sum of the current instruction address, the predicted offset of the branch within the current block of instructions, and an offset value of n where n represents the successive offset between addresses of neighbouring instructions. For a branch-with-link instruction, the sequence of fetch addresses 45 is selected as including those instructions up to and including the branch-with-link instruction, but excludes those instructions of the block which follow the branch-with-link instruction.

If the hit entry of the BTBs 32, 34 identifies that the branch is predicted to be a return branch then a call return stack read command 40 is sent to the call return stack 36, which responds by returning the predicted return address 50 from the top of the call return stack 36, which is output as the next IA 44. In this case, the sequence of instruction addresses 45 to be fetched includes the addresses of those instructions of the current block up to the offset of the return branch instruction, but excludes any addresses of the instructions which follow the return branch in the current block.

If the branch type is predicted to be an unconditional branch instruction then the next IA 44 is identified based on the predicted target address returned by the matching entry for which the hit was detected in the uBTB 32 or the main BTB, 34, and again the branch offset returned by the uBTB 32 or main BTB 34 is used to identify the point of the current block of instructions beyond which the instruction addresses should not be included in the fetch sequence 45.

If the fetch address selector 42 identifies that the predicted branch type is a conditional branch instruction, then the taken/not taken prediction 52 from the conditional branch direction predictor 36 is used to determine whether the branch is predicted taken. If the branch is predicted taken then the next IA 44 is the predicted target address returned by the matching entry of the uBTB 32 or the main BTB 34, while if the branch is predicted not taken, then the next IA 44 is the address of the next sequential block of instructions following on from the current block. The instruction address sequence 45 comprises the addresses of the entire block of instructions if the direction prediction 52 specifies not-taken, and comprises the addresses from the start of the current block up to the address corresponding to the offset of the conditional branch instruction, if the direction prediction 52 specifies taken.

It will be appreciated that FIG. 2 shows just one example of a possible branch predictor implementation, and it is possible for branch predictors to include other prediction structures not shown in FIG. 2. For example for predicting the behaviour of branches within a program loop, it is possible to provide a loop termination predictor for predicting how many iterations of the loop are expected to be performed before terminating the loop. Also more complex prediction structures could be provided for certain types of branches which may have less predictable behaviour, so that their outcome varies between successive instances at the same branch. Hence, the branch type in the BTB entries could also specify that such other predictors should be used for specific types of branch.

Referring back to FIG. 1, the apparatus 2 may also have an instruction prefetcher 60 which is used for speculatively prefetching instructions into the instruction cache 6 before the time at which the instructions are actually demanded to be fetched for processing by the fetch stage 4. Based on the predictions of the branch predictor 30 (e.g. based on the sequence of fetch instruction addresses 45 selected by the fetch address selector 42), the fetch stage 4 may generate a series of demand fetch requests 62 which are sent to the instruction cache 6 identifying the instruction addresses of the instructions which are to be fetched for processing. If the demand fetch request hits in the instruction cache 6 then the instruction can be returned relatively quickly for fetching and decoding by the pipeline. Misses in the instruction cache may cause linefill requests to be added to a request queue 64 from which the linefill requests are forwarded to the level 2 cache 26 or to main memory 28.

To increase the hit rate in the instruction cache 6, the instruction prefetcher may track linefill requests made from the request queue 64 to the level 2 cache 26 and use these to predict what other instruction addresses may be required in future, and based on these predictions can allocate additional prefetch linefill requests 66 into the request queue 64 which may cause further instructions not currently demanded by a demand fetch request 62 to be obtained from the level 2 cache 26 or the main memory 28 and allocated into the instruction cache 6. The prefetching performed by the instruction prefetcher 60 is speculative, since it is possible that the instructions prefetched by the instruction prefetcher 60 may never be requested in a demand fetch request 62 made by the fetch stage 4.

The example above describes triggering prefetch fetches based on an analysis of linefill requests issued from the instruction cache 6, i.e. on misses in the instruction cache.

However, in other examples, the prefetch fetches could be triggered based on the demand fetch requests 62 made to the level 1 instruction cache 6, so that the prefetching of subsequent cache lines can be performed on hits in the level 1 instruction cache 6 as well as on misses. For example, when receiving a demand fetch request 62 for a given address, the prefetcher 60 may look up the next N cache lines from the demand fetch address, and allocate prefetch linefill requests to the request queue 64 for any of those N cache lines that do not already have an entry allocated in the cache 6.

In some cases, the instruction prefetcher could use a simple linear prefetching scheme where, when a line fill request is issued from the request queue 64 specifying a given instruction address, the instruction prefetcher allocates prefetch requests 66 into the request queue which correspond to one or more further cache lines which follow sequentially from the cache line containing the instruction demanded in the linefill request triggered by a demand fetch request 62. This reflects the fact that it is common for program code to proceed sequentially in the majority of cases and so when one instruction is being requested on demand, it is relatively likely that the instructions from the immediately following cache lines may also be required soon. Hence, with a linear prefetching scheme the instruction prefetcher 60 looks ahead by a certain number of cache lines relative to the current instruction address for which instructions are being demanded now, and triggers prefetch requests for those following cache lines. This increases the chance that by the time the fetch stage 4 reaches a given instruction address, then the prefetcher has already triggered prefetching of that instruction into the instruction cache 6 so that the hit rate in the instruction cache has increased.

Other more complex instruction prefetching schemes 60 may use a different scheme to predict which addresses should be prefetched, for example based on stored prefetch state information which tracks the historical patterns of instruction address accesses when previously executing the program code. In some cases such prefetch state information could be trained not only based on linefill requests issued from the instruction cache 6 to the level 2 cache 26, but also potentially based on linefill requests 68 issued from the level 2 cache to main memory 28, or demand fetches as discussed above. The prefetcher could also train its state based on input from the fetch stage 4 indicating which instructions are then subsequently actually fetched for execution, to avoid prefetching again instructions which had turned out not to be needed on an earlier prefetch. Any known instruction prefetching technique can be used to determine which particular addresses should be prefetched into the instruction cache 6.

As shown in FIG. 1, the apparatus 2 may have prefetch-triggered branch prediction updating circuitry 70 which can be used to perform a prefetch-triggered update of branch prediction state stored in at least one branch prediction structure of the branch predictor 30, based on information derived from the prefetched instructions 72 which are prefetched based on the predictions made by the instruction prefetcher 60. Although such prefetch-triggered branch prediction updates can be useful for a range of branch prediction structures, they can be particular useful for the BTBs 32, 34, and especially useful for the uBTB 32. Small BTBs like the uBTB 32 may be located early in the pipeline so that, on a correct prediction, the branch penalty is small (or even zero.) BTBs early in the pipeline are typically very small because they need to achieve a fast response time. When workloads contain lots of branches and the re-reference interval of those branches is large, then the BTBs can be overloaded. New branches will be allocated, but they will be evicted by other branches before they are re-referenced. Hence little performance benefit is extracted from the BTB in these circumstances. The fact that a branch only gets allocated to the BTB after it has been explicitly referenced (fetched on demand from the instruction cache) limits the potential of the BTB in these cases.

Figure 3:
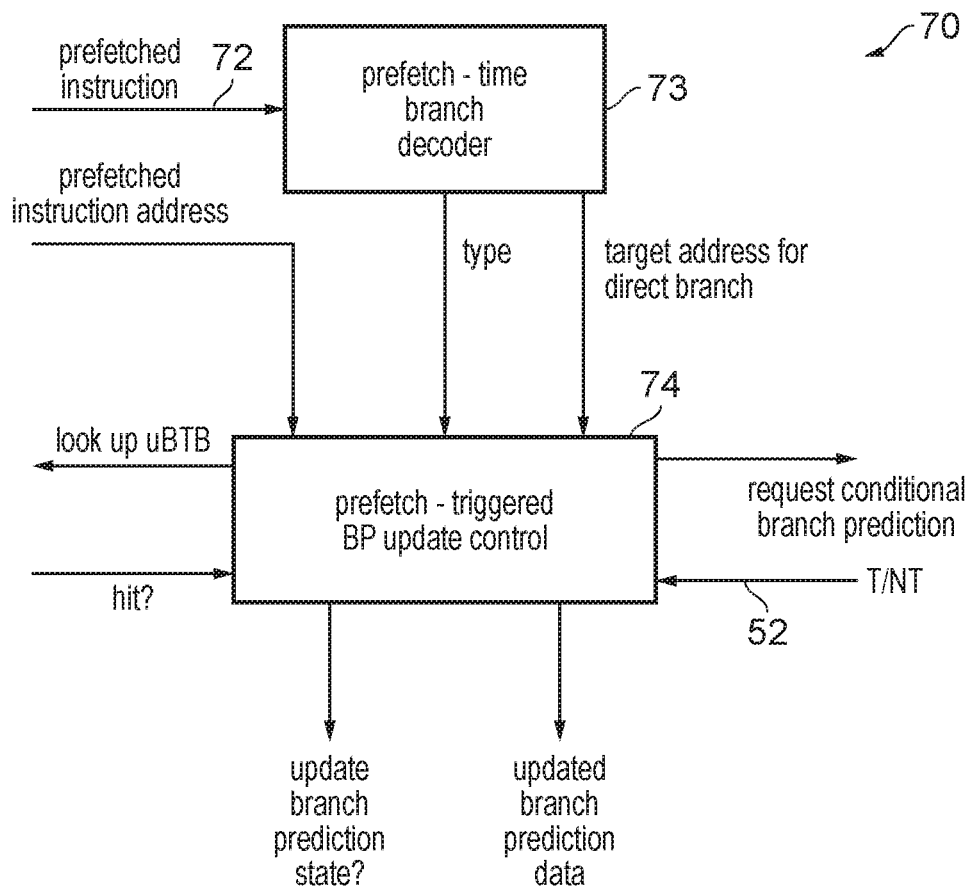
FIG. 3 schematically illustrates control of a prefetch-triggered branch prediction update.

This can be addressed by providing the prefetch-triggered branch prediction update circuitry 70 which is shown in more detail in FIG. 3. The prefetch-triggered branch prediction update circuitry 70 includes a prefetch-time branch decoder 73 and control circuitry 74. The prefetch-time branch decoder 73 performs a decoding operation on prefetched instructions 72 which are fetched into the instruction cache 6 under control of the instruction prefetcher 60. The decoding operation performed by the prefetch-time branch decoder 73 is more limited than that of the instruction decoder 8 provided in the decode stage of the processing pipeline, as it does not need to identify every possible type of instruction, but may be limited to identifying whether the instruction is a branch instruction, and if so, what type of branch instruction is prefetched, and for direct branches, identifying the target address of the branch.

The prefetch-triggered branch prediction update control circuitry 74 receives the indication of branch type and target address for the decoded instruction (and in some cases also an indication of whether the instruction is a branch at all, although in other examples this need not be represented explicitly as it could be implicit from the indication of branch type).

When the prefetch instruction is predicted to be a branch, the prefetch triggered branch prediction update control circuitry 74 may trigger a lookup of the uBTB 32 and determine whether the prefetched instruction address hits in the uBTB 32. The control circuitry 74 may determine, based on whether there is a hit, whether it is necessary to trigger a prefetch-triggered branch prediction update of state in the uBTB 32. Prefetch-triggered updates of branch state may be prevented when there is already a matching entry in the uBTB 32. Also, the control circuitry 74 may, if the instruction is predicted to be a conditional branch, request a conditional branch prediction to be performed by the conditional branch direction predictor 36 and receive in return the predicted branch direction 52 indicating whether the instruction is predicted taken or not taken. The prefetch-triggered conditional branch prediction performed at the time of prefetching an instruction may be more limited than the full prediction which would be performed for actually fetched instructions, as it may exclude any global history value which may index into structures used for the full conditional branch prediction, or could be a static branch prediction. Alternatively, rather than invoking the conditional branch director predictor 36 in the main branch predictor, the control circuitry 74 could perform its own prediction of branch direction, e.g. based on a static branch prediction based on hard-wired logic implementing predetermined rules based on properties derived direct from the branch encoding (e.g. whether the branch offset is positive or negative) rather than on runtime-derived branch prediction state. Based on the lookup in the uBTB 32 and any taken or not taken prediction 52, and the information derived from the decoder 73, the control circuitry 74 determines whether to update the branch prediction state in the uBTB 32 at all, and if so, provides updated branch prediction data to be allocated as a new entry into the uBTB 32.

Figure 4:
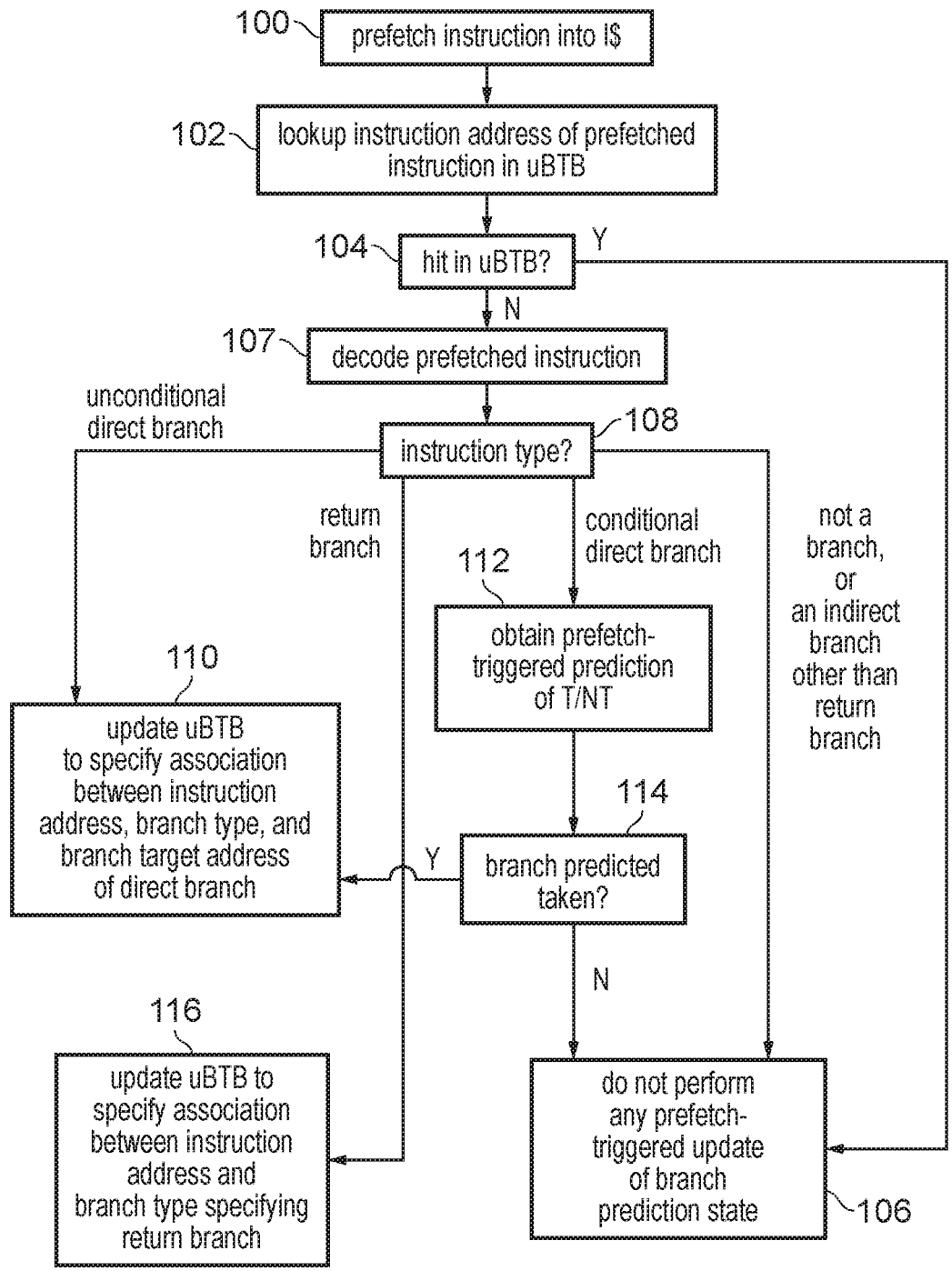
FIG. 4 is a flow diagram showing a method of performing the prefetch-triggered branch prediction update.

FIG. 4 shows a flow diagram illustrating a method for controlling the prefetch-triggered branch prediction update as shown in FIG. 3. At step 100 a given instruction is prefetched into the instruction cache 6 (or alternatively, the prefetch-triggered branch prediction update logic 70 receives an indication of the address of a given instruction which will be prefetched in future). The term "prefetched instruction" is used to describe the remainder of the method of FIG. 4, but this is not intended to imply that this instruction must already have been prefetched into the cache 6 at the time of updating the branch prediction state. Although the update is generally made on prefetching of the instruction into the cache 6, the update of branch prediction state could either precede or follow the updating of the instruction cache 6 with the prefetched instruction, e.g. prefetched instructions could be allocated to a linefill buffer associated with the instruction cache 6 while awaiting allocation to a cache entry, so it is possible the branch prediction state update may be performed first.

At step 102, the control circuitry 74 triggers a lookup of the instruction address of the prefetched instruction in the uBTB 32. At step 104 the control circuitry 74 determines whether this address hits in the uBTB 32, and if so, then at step 106 the control circuitry 74 determines not to perform any prefetch-triggered update of branch prediction state. If there is already an entry in the uBTB then that existing entry is likely to be more accurate than an entry determined based on information derived from the prefetched instruction, and so it may be preferable to retain that existing entry.

If there was a miss in the uBTB for the prefetch instruction address, then at step 107, the prefetched instruction is decoded by the prefetch-time instruction decoder 73 and at step 108 the control circuitry 74 identifies the instruction type. If the prefetched instruction is not a branch instruction at all, or is an indirect branch instruction other than a return branch instruction, then again at step 106 the prefetch-triggered update of branch prediction state is omitted. Indirect branch instructions are excluded from prefetch-triggered update of branch prediction states, because their target addresses depend on data stored in the registers 14 and at the time of prefetching the values which those registers would have at the time when the instruction is later executed will not be known yet.

If at step 108 the prefetched instruction is identified to be an unconditional direct branch then at step 110 a prefetch-triggered branch prediction update is performed to update the uBTB 32 to include a new entry which specifies an association between the instruction address of the prefetched instruction, a branch type indicator indicating that the branch is an unconditional direct branch, and a predicted branch target address, which is set equal to the address specified in the instruction encoding of the direct branch. The branch target address could be expressed either as an absolute address or as a relative offset relative to the instruction address of the branch.

If the prefetched instruction is identified as being a conditional direct branch, then at step 112 the control circuitry 74 obtains a prefetch-triggered prediction of whether the conditional direct branch would be taken or not taken. The prefetch-triggered prediction could be based on a static branch prediction or on a dynamic branch prediction which is made based on a prediction structure which is indexed by an index value which does not depend on the global history value discussed above. In the case of a static prediction, the prediction could be made by the control circuitry 74 itself, or by the branch predictor 30. At step 114 the control circuitry determines whether the prefetch-triggered prediction indicates that the branch is predicted to be taken, and if so again at step 110 the uBTB 32 is updated to include a new entry which specifies the association between the instruction address, branch type and branch target address. Other than having different branch types specified in the allocated uBTB entry, step 110 is the same as is performed for the unconditional direct branch.

If at step 114 the conditional direct branch is indicated by the prefetch-triggered prediction to be predicted not-taken, then the method again proceeds to step 106 where the control circuitry 74 determines that no prefetch-triggered update should be performed. By omitting the prefetch-triggered update for not-taken-predicted branches, this avoids evicting state from the uBTB 32 associated with other branches predicted to be taken, which is more likely to provide a performance boost as the behaviour of not-taken branches may be assumed anyway as a default prediction in cases when an instruction address misses in the BTB.

If at step 108 the prefetched instruction is identified to be a return branch instruction then at step 116 the control circuitry 74 triggers a prefetch-triggered update to the uBTB 32 to include a new entry specifying an association between the instruction address of the prefetched instruction and a branch type indicator which specifies that the instruction is a return branch instruction. This indicates that when the instruction is subsequently fetched by the fetch stage 4, the branch predictor can identify that the instruction is a return branch and predicts the target address of the branch based on the value obtained from the call return stack 38. Although not indicated in FIG. 4, if the instruction set architecture supports conditional return branch instructions, then for conditional return branch instructions steps 112, 114 may be performed similar to the conditional direct branch instruction, with step 116 then being performed in the event that the prefetch-triggered prediction predicts that the return branch is predicted taken.

In summary, the technique discussed above provides for a prefetch-triggered branch prediction update which helps to increase hit rate in the uBTB 32, by training branch prediction state based on information derived from the prefetched instruction addresses rather than exclusively based on information from demand-fetched instructions after fetching/decoding. It will be appreciated that in addition to the prefetch-triggered branch prediction update, the branch prediction state may still also be updated based on the information derived from demand-fetched instructions.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
   processing circuitry to perform data processing in response to instructions fetched from an instruction cache wherein the processing circuitry is configured to demand said instructions from the instruction cache;
   a branch predictor having at least one branch prediction structure to store branch prediction data for predicting at least one branch property of an instruction fetched for processing by the processing circuitry; and
   an instruction prefetcher to speculatively prefetch instructions into the instruction cache before the instructions are demanded by the processing circuitry, wherein the instructions demanded by the processing circuitry are based at least in part on predictions of the branch predictor; wherein:
   on prefetching of a given instruction into the instruction cache by the instruction prefetcher before the given instruction is demanded, the branch predictor is configured to perform a prefetch-triggered update of the branch prediction data based on information derived from the given instruction prefetched by the instruction prefetcher.

2. The apparatus according to claim 1, in which the prefetch-triggered update of the branch prediction data comprises allocation of a new entry of branch prediction state specifying at least one of a branch type and a branch target address derived from the given instruction prefetched by the instruction prefetcher.

3. The apparatus according to claim 1, in which the branch predictor is configured to omit performing the prefetch-triggered update when the at least one branch prediction structure already includes an entry corresponding to the given instruction.

4. The apparatus according to claim 1, in which the prefetch-triggered update is based on information obtained by decoding an instruction encoding of the given instruction.

5. The apparatus according to claim 1, in which on prefetching the given instruction, the branch predictor is configured to perform the prefetch-triggered update when the given instruction is identified to be one of a subset of branch instruction types.

6. The apparatus according to claim 5, in which said subset of branch instruction types excludes at least one branch instruction type supported by the processing circuitry.

7. The apparatus according to claim 6, in which said at least one branch instruction type comprises an indirect branch instruction other than a return branch instruction.

8. The apparatus according to claim 1, in which when the given instruction is a direct branch instruction, the prefetch-triggered update comprises allocating a new entry of branch prediction state specifying an association between an instruction address of the direct branch instruction and a branch target address specified by the direct branch instruction.

9. The apparatus according to claim 1, in which when the given instruction is a return branch instruction, the prefetch-triggered update comprises allocating a new entry of branch prediction state specifying an association between an instruction address of the return branch instruction and a branch type indication specifying that the instruction at that instruction address is a return branch instruction.

10. The apparatus according to claim 1, in which when the given instruction is a conditional direct branch instruction, the branch predictor is configured to:
  obtain a prefetch-triggered prediction of whether the conditional direct branch instruction is to be taken or not-taken;
  perform the prefetch-triggered update when the prefetch-triggered prediction predicts that the conditional direct branch instruction is to be taken; and
  omit the prefetch-triggered update when the prefetch-triggered prediction predicts that the conditional direct branch instruction is to be not-taken.

11. The apparatus according to claim 10, in which the prefetch-triggered prediction comprises a static branch prediction.

12. The apparatus according to claim 10, in which the branch predictor is configured to maintain a global history value tracking taken or not-taken outcomes or branch instruction addresses for a sequence of two or more branch instructions; and
  the prefetch-triggered prediction comprises a dynamic branch prediction based on branch prediction state stored in a branch prediction structure indexed based on an index value determined independent of the global history value.

13. The apparatus according to claim 1, in which the at least one branch prediction structure comprises at least one branch target buffer for which said at least one branch property includes at least a branch target address; and
  the prefetch-triggered update of the branch prediction data comprises an update in the at least one branch target buffer.

14. The apparatus according to claim 1, in which the at least one branch prediction structure comprises a first branch target buffer and a second branch target buffer, where for both the first branch target buffer and the second branch target buffer, said at least one branch property includes at least a branch target address, and the first branch target buffer and the second branch target buffer satisfy at least one of:
  the first branch target buffer comprises fewer branch prediction entries than the second branch target buffer; and
  branch predictions made for a given instruction based on the second branch target buffer are made available when the given instruction is at a later pipeline stage than branch predictions made for the given instruction based on the first branch target buffer.

15. The apparatus according to claim 14, in which the prefetch-triggered update of the branch prediction data comprises an update in the first branch target buffer.

16. An apparatus comprising:
  means for performing data processing in response to instructions fetched from an instruction cache wherein the means for performing data processing is configured to demand said instructions from the instruction cache;
  means for branch prediction having at least one branch prediction structure to store branch prediction data for predicting at least one branch property of an instruction fetched for processing by the processing circuitry; and
  means for speculatively prefetching instructions into the instruction cache before the instructions are demanded by the means for performing data processing, wherein the instructions demanded by the means for performing data processing are based at least in part on predictions of the means for branch prediction; wherein:
  on prefetching of a given instruction into the instruction cache by the means for speculatively prefetching before the given instruction is demanded, the means for branch prediction is configured to perform a prefetch-triggered update of the branch prediction data based on information derived from the given instruction prefetched by the instruction prefetcher.

17. A data processing method comprising:
  demanding instructions from an instruction cache;
  performing data processing in response to said instructions fetched from the instruction cache;
  speculatively prefetching instructions into the instruction cache before the instructions are demanded, wherein the demanding instructions is based at least in part on predictions of a branch predictor; and
  on prefetching of a given instruction into the instruction cache by an instruction prefetcher before the given instruction is demanded, performing a prefetch-triggered update of branch prediction data stored in at least one branch prediction structure of the branch predictor, based on information derived from the given instruction prefetched by the instruction prefetcher.

* * * * *